Figure 1:
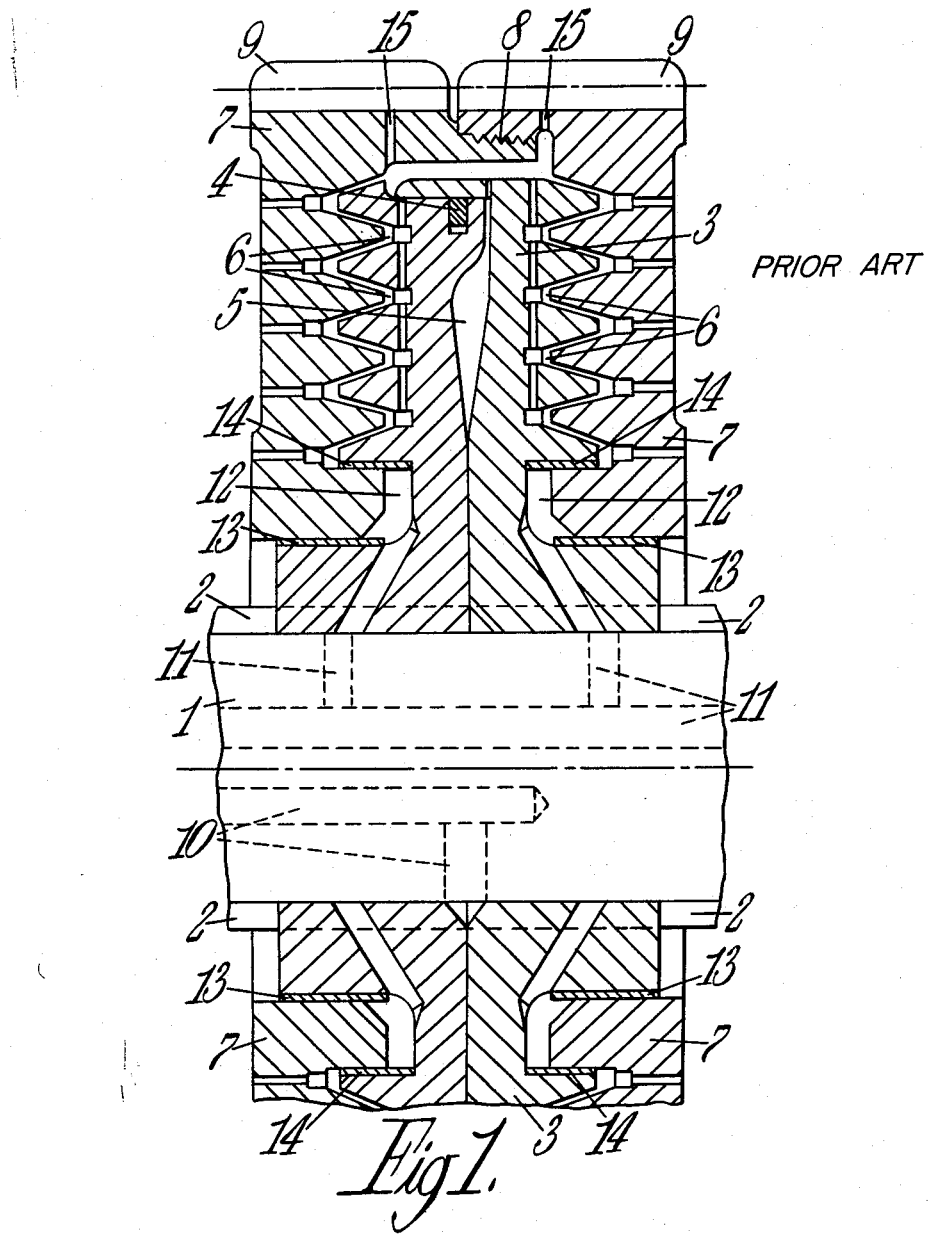

United States Patent Office 3,115,231
Patented Dec. 24, 1963

3,115,231
OIL OPERATED CLUTCHES
Thomas Hindmarch, Lindo Lodge, Stanley Ave.,
Chesham, Buckinghamshire, England
Filed Apr. 27, 1961, Ser. No. 106,128
Claims priority, application Great Britain July 5, 1960
2 Claims. (Cl. 192—86)

This invention relates to pressure liquid operated friction clutches of the kind having inner and outer inter engageable grooved metal friction members, the inner members of which are adapted for movement away from and towards one another in a telescopic manner for engagement with and disengagement from the outer friction members respectively, the inner friction members enclosing therebetween a pressure chamber for the operating liquid for the purpose of engaging the clutch, while the outer members are rigidly connected together and form a cavity therebetween in which the inner friction members are located. The grooved surfaces upon the outer friction member face inwardly while the complementary grooved surfaces upon the inner clutch members face outwardly.

It is usual in the above form of construction to provide pressure chambers for the disengagement of the friction members in the form of stepped pistons positioned towards the axis of rotation of the clutch, the boundaries of the chambers being formed on the one side by the inner friction members and on the other side by the outer friction members, so that pressure exerted within the said chambers forces the said members apart and disengages their co-operating friction surfaces.

The effective area of the engaging chamber is formed much greater than that of the disengaging chamber so that when pressure is applied to both chambers the clutch becomes engaged, while when pressure is removed from the engaging chamber the clutch becomes disengaged. The pressure liquid is applied continuously to the disengaging chamber.

When a clutch of this kind is used, for example, in a parallel shafted constant mesh reversing gear for engaging pinions on the shafts alternatively for the different directions of drive the two parts of the disengaging clutch rotate at approximately equal speeds in opposite directions. The pressure oil used to operate the disengaging chambers lubricates the two bearings of the stepped piston assembly, and the outer of these bearings drains outwards through the space between the grooved interengageable surfaces of the friction members before it reaches the periphery of the clutch and is drained away by bleed holes provided for that purpose.

When disengaged these grooved faces have only a limited clearance between one another and under the circumstance mentioned above are rotated in opposite directions. The stream of oil or the succession of globules of oil thrown by centrifugal force in an outward direction necessarily collide with both faces and continue to move outwards from the V-shaped interstices in contact simultaneously with both of the counter revolving faces. Frictional heat is generated at a rate proportional to the square of the relative velocities. The disadvantages of this are two-fold, firstly that there is a measurable loss of power and secondly that the disengaged clutch heats up at high speeds.

The object of the present invention is to overcome the disadvantages above referred to.

The invention consists in a pressure liquid operated friction clutch of the kind referred to having pressure chambers in the form of stepped pistons for disengaging the friction members of the clutch situated towards the axis of rotation of the clutch and in which the pressure liquid may leak from each chamber in the direction of the inter-engageable friction surfaces by way of the sides of the said stepped pistons characterised in that there is provided a trap in the path of the escaping liquid between each disengaging chamber and the said inter-engageable friction surfaces for intercepting the pressure liquid and alowing it to escape directly to the exterior of the clutch thereby by-passing the friction surfaces.

The invention further consists in a structure as set forth in the preceding paragraph in which the or each trap comprises an annular chamber between the said side of the piston by way of which the liquid escapes and the said friction surfaces which, in cross section, is provided with a surface on the side away from the said axis which follows at first a direction away from the said axis, in the direction of the friction surfaces, and then in a direction towards the axis, in the direction of the friction surfaces, thereby providing a hollow in which the liquid accumulates under centrifugal force, and passageways in the outer clutch member from the said hollow to the exterior of the clutch leading in a direction away from the said axis to drain the liquid from said hollow.

The invention still further consists in a structure as set forth in the preceding paragraph in which there are provided passageways between the said hollow and the said friction surfaces by which a controlled quantity of liquid may reach the friction surfaces to lubricate them.

The result of the invention is that the power loss and overheating formerly encountered with this form of clutch is now eliminated. The leakage which formerly was entrapped between the counter revolving grooved discs is now intercepted before reaching the grooves and the faces are allowed to rotate with an air space between them and without oil drag.

Figure 2:
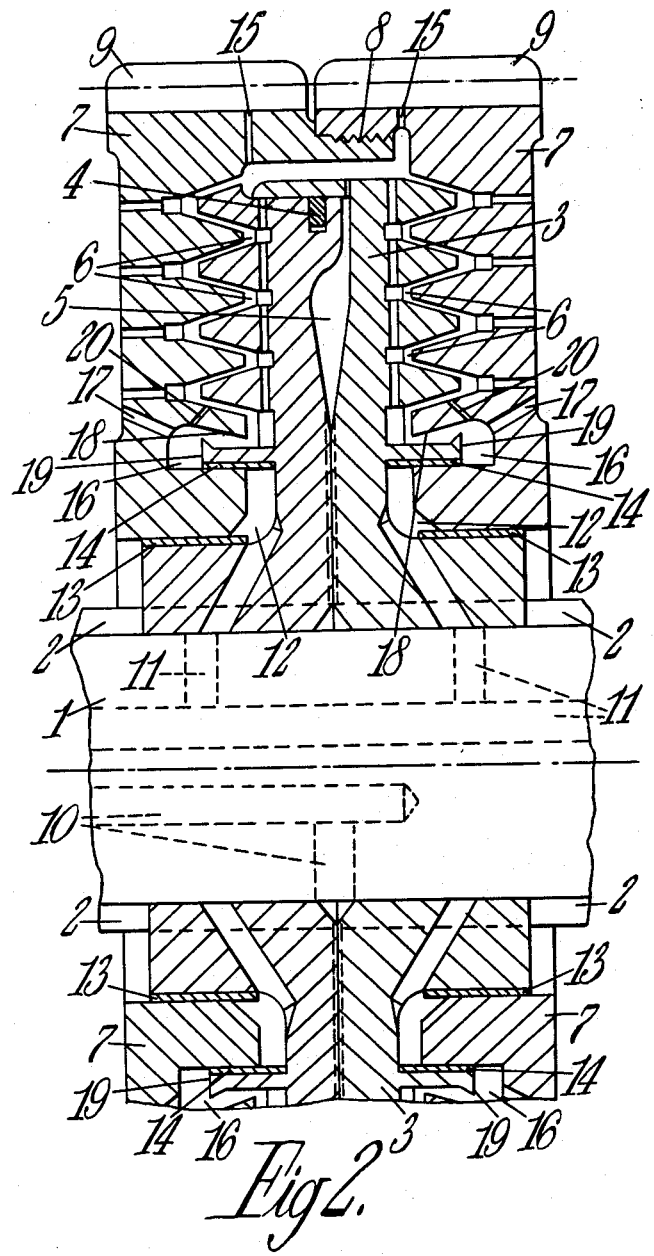

The accompanying drawing shows in FIGURE 1 a longitudinal section of a known clutch of the kind with which this invention is concerned, while FIGURE 2 shows by way of example only, a longitudinal section of one mode of carrying the invention into effect.

In FIGURE 1, shaft 1, with splines 2, carries two telescoping bronze members 3, sealed together by piston ring 4, and enclosing pressure chamber 5. Circular V grooves 6 engage with corresponding ridges and grooves in the two steel members 7, which are screwed together at 8, and have gear teeth 9, cut on the outer members 7. Oil passages 10 communicate with the engaging chambers 5. The stepped piston construction at 12 has white metal bearings at 13 and 14 which support the outer clutch assembly on the inner clutch assembly and enclose the annular disengaging chambers 12 with which the oil passages 11 communicate. Oil passages 11 are always under pressure as also are the chambers 12 whereas pressure is applied through passage 10 only when it is desired to engage the clutches.

The clutch is shown in the disengaged position and the flow of pressure oil from chamber 12 passes through bearings 14 into the spaces between the revolving clutch members, the drain holes 15 being provided to allow the escape of trapped oil at the periphery, i.e. when the oil has travelled from chamber 12 to the radial extremity 15.

FIGURE 2 shows a clutch constructed in accordance with the invention in which the oil collector cavity 16, is provided having radially inclined drain holes 17, the recessive face 18, and the thrower ring 19. Oil now passing through bearing 14 is intercepted by the trap and is cleared to atmospheric pressure in the casing without passing through the clutch.

In order that a thin film of oil be maintained upon the friction surfaces ready for engagement of the clutch, small holes 20 are bored between the cavity 16 towards the friction surfaces so that a controlled degree of lubrication is provided for these surfaces. The diameter of these oilways may be adjustable by means of grub screws if desired.

The advantages arising from this invention are substantial. Modern trends are for higher engine speeds, while elimination of power losses in ships leads to lower fuel consumption. Smaller coolers, smaller cooling water pumps, and smaller circulatory systems reduce the initial capital cost of ships. Also, lower mean temperatures of marine and locomotive transmissions give longer gear wheel life.

It is to be understood that the above description is by way of example only and that details for carrying the invention into effect may be varied without departing from the scope of the invention claimed.

I claim:

1. A pressure liquid operated friction clutch comprising a rotatable first clutch member having inner and outer faces, a series of alternating ridges and grooves on the inner face of said first clutch member, a rotatable second clutch member in the form of a disc having inner and outer faces mounted within and concentric of said first clutch member, a series of alternating ridges and grooves on the outer face of said disc, said disc being adapted to be moved axially whereby its ridges and depressions engage with the ridges and grooves of said first clutch member for engaging the clutch, a means for introducing pressure liquid to the inner face of said disc for moving the ridges and grooves of said disc into engagement with the ridges and grooves of said first clutch member, the outer face of said second clutch member having an annular chamber, an annular flange on the inner face of said first clutch member located within said chamber with the end of said flange terminating in spaced relation to the base of said chamber when said series of alternating ridges and grooves are in the engaged position for forming a pressure space, means for maintaining pressure liquid in said pressure space for moving the series of alternating ridges and grooves of said disc out of engagement with the series of alternating ridges and grooves of said first clutch member and from which space liquid may leak in the direction of said series of alternating ridges and grooves on said first and second clutch members, the improvement comprising a trap located between said pressure space and said series of alternating ridges and grooves for entrapping liquid leaking radially outward from said pressure space, said trap being defined by an annular chamber in the inner face of said first clutch member between the sides of said pressure space by way of which the liquid escapes and said series of alternating ridges and grooves on the inner face of said first clutch member, said inner face of said first clutch member including a wall extending in the direction of, but terminating short of the outer face of said second clutch member, a thrower ring on the outer face of said second clutch member extending into said annular chamber and being spaced from said wall, said wall and thrower ring being located in the path of the escaping liquid between said annular chamber and said series of alternating ridges and grooves for intercepting the pressure liquid and said first clutch member having a passageway therein leading from said annular chamber to the outer face of said first clutch member for allowing the liquid to escape directly from said annular chamber to the exterior of the clutch.

2. The pressure liquid operated friction clutch as claimed in claim 1 in which said wall is provided with passageways permitting a controlled quantity of liquid to flow from said trap to said series of alternating ridges and grooves on said first and second clutch members.

References Cited in the file of this patent

UNITED STATES PATENTS

| 2,498,123 | Hobbs | Feb. 21, 1950 |
| 2,592,695 | Hindmarch | Apr. 15, 1952 |
| 2,734,607 | Hindmarch | Feb. 17, 1956 |

FOREIGN PATENTS

| 815,382 | Great Britain | June 24, 1959 |